United States Patent Office 3,827,984
Patented Aug. 6, 1974

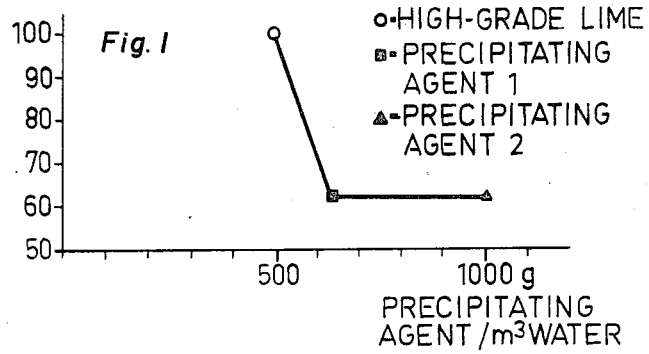
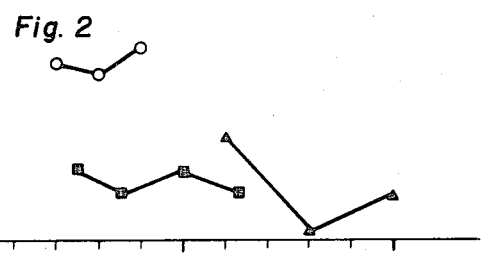
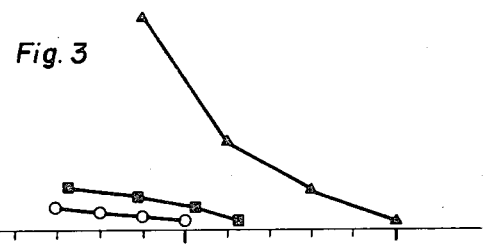
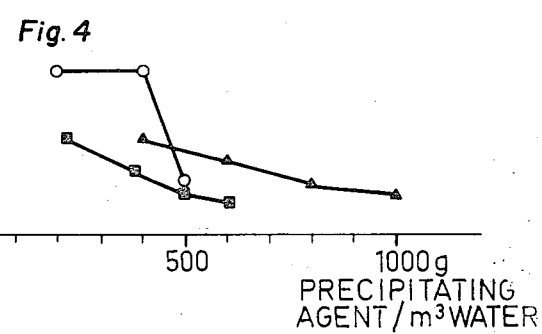

3,827,984
PRECIPITATING AGENT FOR WATER PURIFICATION PROCESSES, AND A METHOD OF PREPARING SAME
Kjell Gunnar Káwe Káwert, Skövde, Sweden, assignor to Aktiebolaget Gullhogens Bruk, Skovde, Sweden
Filed June 1, 1972, Ser. No. 258,613
Int. Cl. B01j 13/00; C02b 1/16, 5/02
U.S. Cl. 252—179                 2 Claims

ABSTRACT OF THE DISCLOSURE

The present invention relates to an agent for purification of water by precipitation, and a method for preparing this precipitating agent. The water shall be purified to such an extent that raw water becomes potable and suitable for cooking and food preparing, and sewage must be cleansed so that it can be released into recipients without causing harm or inconvenience. The substances to be removed are primarily iron, manganese, aluminium and various phosphates, but the water may also contain copper, lead and mercury. The precipitating agent according to the invention comprises a mixture of minerals which after a previous burning have different solubility products, which mixture has a mole ratio of 1.0–5.0 between basic and acid oxides, and a content of 5–40% $SiO_2$, 5–15% $Al_2O_3$, 3–12% $Fe_2O_3$, 15–70% CaO and 0.1–20% MgO in an ignited sample. In the preparation of the precipitating agent the starting materials are blended in such proportion and burnt at such temperature that sufficient mineral formation is obtained and so that the burnt mixture contains minerals of different solubility products has a mole ratio between basic and acid oxides of 1.0–5.0 and the above mentioned analysis data. The product is subsequently ground to a powder having a fineness of 10–20% by weight greater than 60 $\mu$m. and 0–2% by weight greater than 90 $\mu$m.

---

Figure 5:
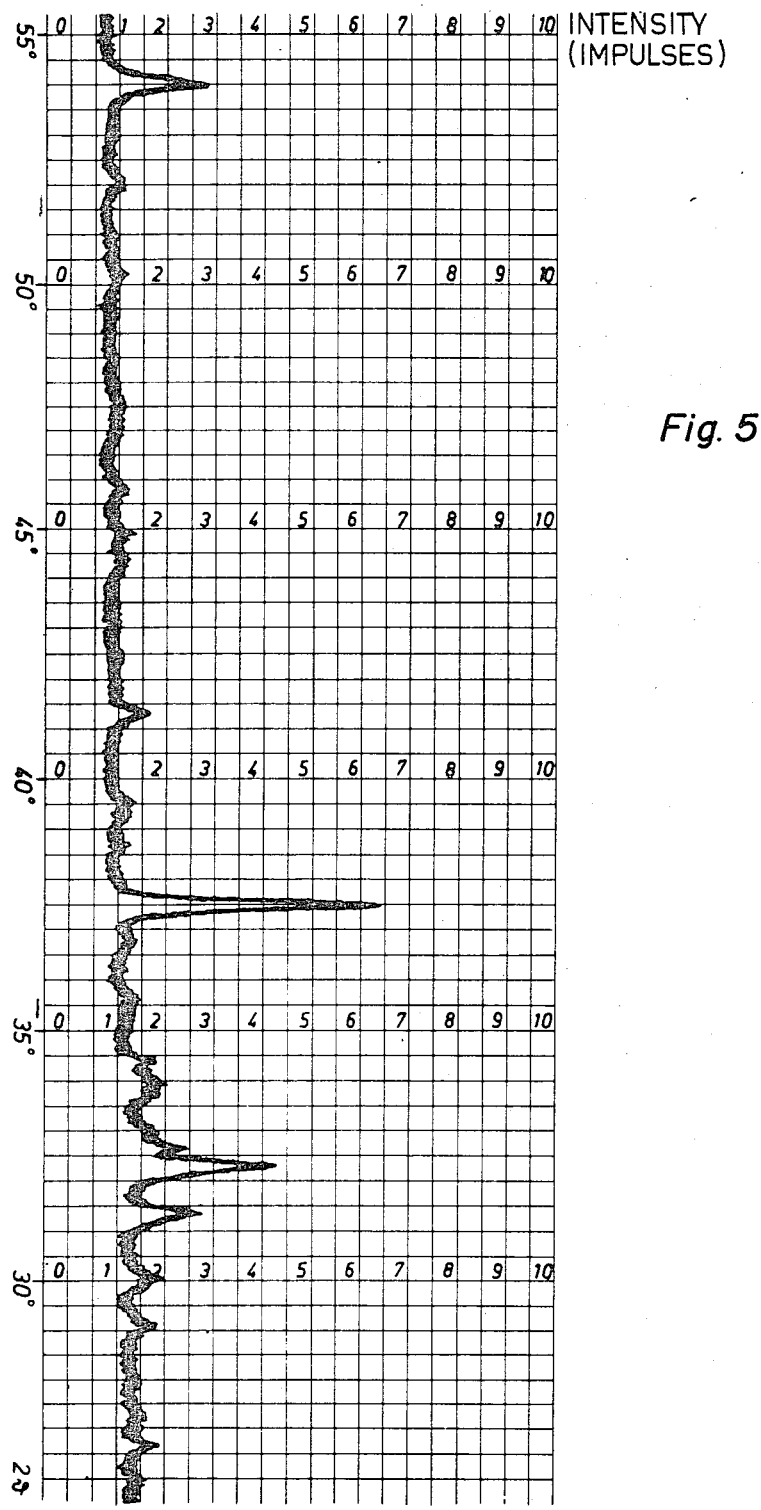

The present invention relates to a precipitating agent for water purification processes and to method of preparing such an agent.

The water to be purified may comprise unfiltered water, i.e. water arriving at the waterworks or like water purification plant from such reservoirs as lakes, rivers etc., or in the form of ground water, rainwater and the like. The water to be treated may also comprise sewage, especially domestic and industrial sewage.

Unfiltered or raw water is purified by adjusting its pH and precipitating out dissolved salts and impurities. Water obtained from unfiltered or raw water must be potable and suitable for cooking and preparing food and should not give rise to deposits in conduits and processing apparatus.

The sewage must be cleansed to such a degree that it can be released into the recipient without causing harm or inconvenience.

Among other things, raw water contains iron, manganese, aluminium and different phosphates. These substances are also present in sewage, although in concentrations ten times greater than in raw water, and in addition to such substances, sewage also contains a large number of organic substances, and also virus and bacteria. Sewage may also contain heavy metals, such as copper, lead and mercury in relatively large quantities.

Iron, manganese and aluminium impurities are normally removed by chemical precipitation techniques, by adding aluminium sulphate and/or calcium oxide to the suspension. The technique employed is basically the same for both raw water and sewage. The precipitating agent is added in quantities sufficient to cause the pH of the water to favour the precipitation of iron, manganese and aluminium and also to precipitate out the impurities. The quantity of precipitating agent used is approximately 50 gr./m.³ with respect to raw or unfiltered water and approximately 500 gr./m.³ in the case of sewage.

A neutral or slightly alkaline raw water requires different treatment than an acid water, while in the case of sewage, the purification process must be adapted to the impurity content of the sewage.

With all flocculation or precipitation process, precipitation begins with the formation of microflocs, which then combine together to form macroflocs. The nature of the macroflocs should be such that optimum adsorption and/or recipitation of complex salts is obtained. The substances separated by adsorption and/or the precipitation of complex salts include phosphates, heavy metals and residual substances from the biological purification process.

Fine, dispersed substances can be converted to a form in which they can be separated from the water by adding thereto flocculating agents or agents which promote flocculation. This technique is well known.

A number of scientists designate the first stage in the process of flocculation, i.e. the formation of microflocs, the coagulation stage, and the second stage, in which macroflocs are formed, the flocculation stage. The present invention includes both of these stages.

The purification of sewage is effected in three stages, of which the first involves the mechanical sedimentation of coarse waste. In the second stage (biological purification) the organic substances not sedimented in the first stage or those present in the water in solution are decomposed, while the third stage (chemical purification) involves removal by precipitation from the water of the substances formed in the biological stage, nutrient salts, and iron, manganese, aluminium and heavy metals.

There are also three distinct chemical precipitation processes. Direct precipitation or primary precipitation involves the addition of a precipitating agent during the first stage; simultaneous precipitation involves the addition of a precipitating agent during the biological purification stage, while with afterprecipitation the precipitating agent is added during the third stage.

A number of the known precipitating agents, mostly iron and aluminium salts, require flocculation to take place at a relatively specific pH. With acid water, lime in the form of calcium oxide has long been used as a pH regulator, the substance used being burnt limestone with a high content of lime.

The present invention relates to a substance which enables micro and macroflocs to be formed in a manner such that the structure of the flocs in subsequent apparatus imparts to the sludge obtained important technical properties. For example, the improvements obtained include smaller quantities of sludge, easier dewatering of the sludge, higher settling rates, and elevated effects with respect to the precipitation of heavy metals etc.

The precipitating agent of the present invention is mainly characterized by a certain composition of the chemical elements embodied therein, as evident from the analysis data that follows:

ANALYSIS DATA ON IGNITED SAMPLES

|  | Percent |
|---|---|
| $SiO_2$ | 15–40 |
| $Al_2O_3$ | 5–15 |
| $Fe_2O_3$ | 3–12 |
| CaO | 15–70 |
| MgO | 0.1–20 |

TABLE I
Chemical composition of conventional lime and of the precipitating agent according to the invention

|  | High percent lime | Precipitating agent 1[1] | Precipitating agent 2[1] |
|---|---|---|---|
| Chemical analysis: | | | |
| SiO$_2$ | 5.5 | 19.5 | 30.4 |
| Al$_2$O$_3$ | 0.4 | 7.3 | 10.9 |
| Fe$_2$O$_3$ | 0.2 | 4.7 | 8.1 |
| CaO | 91.5 | 61.9 | 44.1 |
| MgO | 1.3 | 1.8 | 2.1 |

[1] According to the invention.

NOTE.—Alkali, sulphur compounds, ignition losses etc., up to 100 percent.

TABLE II
Examples of the composition of precipitating agents of the present invention

|  | Designation | 1 | 2 | 3 | 4 | 5 |
|---|---|---|---|---|---|---|
| Mineral: | | | | | | |
| Calcium silicate | CS | 10 | | | | |
| Do | β-C$_2$S | 29 | 30 | 54 | 49 | 40 |
| Calcium aluminate | CA | | 6 | 9 | 7 | 7 |
| Magnesium aluminum silicate | M$_2$AS | 18 | | | | |
| Calcium aluminum silicate | C$_2$AS | | 10 | 5 | | |
| Calcium aluminum ferrite | C$_4$AF | 14 | 7 | 17 | 14 | 12 |
| Calcium oxide | C | 5 | 14 | 3 | 21 | 34 |
| Calcium ferrite | CF | 6 | 4 | 4 | | |
| Magnesium silicate | MS | 10 | 5 | | 4 | 2 |
| Aluminum silicate | AS | | 3 | | | |
| Iron silicate | FS | | 4 | | | |
| Quartz | S | 5 | 12 | 2 | | |
| Oxides: | | | | | | |
| SiO$_2$ | | 32 | 30.4 | 22 | 19.5 | 15 |
| Al$_2$O$_3$ | | 13 | 10.9 | 11 | 7.3 | 7 |
| Fe$_2$O$_3$ | | 9 | 8.1 | 9 | 4.7 | 4 |
| CaO | | 32 | 44.1 | 52 | 61.9 | 68 |
| MgO | | 10 | 2.1 | 0.2 | 1.8 | 1 |
| Total | | 96 | 95.6 | 94.2 | 95.2 | 95 |
| Mole ratio basic oxides/acid oxides | | 1.1 | 1.3 | 1.8 | 2.7 | 3. |

The precipitating agent 2 in Table II correspondents to precipitating agent 2 in Table I, and precipitating agent 4 corresponds to precipitating agent 1 in Table I.

It is important to the present invention that the relationship of the basic oxides to the acid oxides in the precipitating agents has been correctly adjusted. The mole ratio of the basic oxides to acid oxides must not be less than 1 if a satisfactory degree of purification is to be obtained. If the mole ratio exceeds 5, on the other hand, the beneficial properties of the sludge progressively decrease. If the product has been satisfactorily burnt, a mole ratio of basic oxides to acid oxides whose quotient lies between 1.0 and 5.0 implies that the quantity of mineral contained in the precipitating agent is sufficient to ensure the desired technical effect of the sludge, as hereinafter illustrated.

The active mineral in the high-percent or high-grade lime substance conventionally used is mainly calcium oxide, while the active minerals present in the precipitating agents of the present invention are selected from the groups calcium silicate, calcium ferrite, calcium aluminate, calcium aluminium silicate, calcium aluminium ferrite, calcium iron silicate, calcium magnesium aluminate ferrite, aluminium silicate, iron silicate, iron aluminium oxide, calcium oxide, magnesium silicate and quartz.

The accompanying diagrams of FIGS. 1-5 illustrate examples of the technical effect obtained with the precipitating agent of the present invention. FIG. 1 illustrates how a reduction in sludge volume is obtained when using the precipitating agent of the present invention, FIG. 2 shows that only a small amount of substances remain suspended subsequent to the after-precipitation stage, FIGS. 3 and 4 illustrate the result of the precipitation of nutrient salts, and FIG. 5 is an X-ray diffraction graph showing the composition of precipitating agent 2. The diagram of FIG. 5 also shows the primary X-ray reflexes obtained for different minerals present in the precipitating agent.

With biologically purified water, certain substances remain suspended therein. When effecting an after-precipitation step with conventional lime, 80% of the suspended substances remain as opposed to only 20% when effecting the step with a precipitating agent prepared in accordance with the invention. FIG. 2 shows this effect, which is due to the fact that the settling effect of floc formed with the precipitating agent of the present invention is considerably improved over that of floc formed with conventional agents and that the floc can be dewatered far more readily in subsequent processing apparatus. This implies a technical improvement in respect of raw water and sewage purification techniques of a magnitude which at present cannot be foreseen.

Several methods are known by which sewage can be purified. The ones most used are the direct precipitation method (the precipitating agent is added to the suspension before the biological stage) and the after-precipitation method (the so-called third stage, in which the precipitating agent is added after the biological stage).

The precipitating agent of the present invention provides a nutrient salt precipitation effect which fully satisfies the standard required of a sewage purification plant. This is shown in FIGS. 3 and 4. FIG. 3 illustrates the remaining total phosphorus content in directly precipitated sewage, i.e. water which has not been previously biologically purified. The phosphorus content is shown in 18 mg. P/l. As will be seen from the FIG. 3, the precipitating agent of the present invention purifies the water of phosphorus to a content of 1 mg. P/l. FIG. 4 illustrates the amount of phosphorus remaining in biologically purified sewage subsequent to treating the purified sewage with the precipitating agent of the present invention. The phosphorus content of the biologically purified sewage was 5.6 mg. P/l. In this instance, equal quantities of agent 1 and 2 and conventional lime were used, namely 500 gr./l., in order to attain the standard of 1 mg. P/l. in the effluent. After-precipitation, the third stage, is a process now recommended by the National Nature Conservancy Board.

One reason for the improved effect afforded by the precipitating agent of the present invention may reside in the inclusion of the aforementioned minerals, as opposed to the "chemically" pure aluminium sulphate and/or high-grade lime oxide conventionally used. These minerals have mutually different products of solubility. This means that the formed aluminium and iron flocs may contain nuclei of less readily dissolved minerals, calcium phosphates and/or complex salts of different types as mineral hydrates and heavy metals. This causes the flocs to be heavier, denser and possibly also to have a greater tendency to adsorb other insoluble salts and suspended substances remaining from the biological step. As a result hereof, the settling rate and dewatering effect of the flocs is improved.

The method of producing the precipitating agent according to the invention will now be described with reference to a number of examples.

EXAMPLE 1

A low-grade lime stone, crushed and ground to a maximum of 20% greater than 90 μm., was mixed with quartzite, ground to a maximum of 5% greater than 90 μm., in the proportions of 82:18. The mix was granulated and charged to a 90 m. long rotary furnace and burned in a weakly oxidizing atmosphere with a burning zone temperature of 1000–1050° C. The material was held in the furnace for a total period of 5 hrs. and the temperature rise between 900 and 1050° C. took between 2 and 3 hrs. The obtained calcines were then cooled and ground to a fineness of 10–20% greater than 60 μm. and 0–2% greater than 90 μm.

An analysis of the starting material and the finished product is given below.

| | Percent | | |
|---|---|---|---|
| | Lime stone | Quartz- ite | Product |
| Analysis: | | | |
| SiO2 | 12.9 | 70 | 34.2 |
| Al2O3 | 4.8 | 4.0 | 5.9 |
| Fe2O3 | 3.1 | 0.5 | 3.9 |
| CaO | 40.9 | 1.0 | 41.7 |
| MgO | 1.2 | 0.5 | 1.6 |
| Ignition losses | 34.0 | 25 | 0 |

NOTE.—The mole ratio basic oxides/acid oxides=1.21.

EXAMPLE 2

Slate was ground until more than 80% passed a 90 μm. screen and mixed with pyrite cinders in the proportions 95:5. The roasted pyrites contained a maximum of 5% greater than 90 μm. The mix was then granulated and charged to a 90 m. long rotary furnace and burnt at a temperature of roughly 1050° C. The material was held in the furnace for a total stay-time of 5 hrs. and the temperature rise 900° C.–1050° C. took from 2 to 3 hrs. The obtained calcines were then cooled and ground to the same degree of fineness as that referred to in Example 1.

An analysis of the starting material and the finished product is given below.

| | Percent | | |
|---|---|---|---|
| | Slate | Pyrite cinders | Product |
| Analysis: | | | |
| SiO2 | 22.1 | 5.0 | 24.6 |
| Al2O3 | 7.9 | 8.0 | 11.0 |
| Fe2O3 | 2.0 | 82.0 | 8.4 |
| CaO | 40.0 | 1.0 | 53.1 |
| MgO | 0.1 | 0.1 | 0.1 |
| Ignition losses | 30.0 | 0 | 0 |

NOTE.—Mole ratio basic oxides/acid oxides=1.45.

EXAMPLE 3

High-grade lime stone was ground to a fineness of a maximum of 20% greater than 90 μm. and mixed with roasted pyrite cinders having a maximum of 5% greater than 90 μm., in the proportions of 90:10. The mix was then granulated and charged to a 90 m. long rotary furnace and burned at a temperature of roughly 1250° C. in a weakly oxidizing atmosphere. The material was held in the furnace for approximately 7 hrs. and the temperature rise from 900° C. to 1250° C. took roughly 4 hrs. The product was then ground to the same degree of fineness as that referred to in Example 1.

An analysis of the starting material and the finished product is given below.

| | Percent | | |
|---|---|---|---|
| | Lime stone | Pyrite cinders | Product |
| Analysis: | | | |
| SiO2 | 8.0 | 5.0 | 11.5 |
| Al2O3 | 2.7 | 8.0 | 3.8 |
| Fe2O3 | 1.6 | 82.0 | 14.3 |
| CaO | 49.0 | 1.0 | 65.8 |
| MgO | 2.0 | 0.1 | 2.7 |
| Ignition losses | 37.0 | 0 | 0 |

NOTE.—Mole ratio basic oxides/acid oxides=4.1.

As a rule, the temperature during the burning period should be maintained between 900° C. and 1500° C., preferably between 950° C. and 1300° C.

What is claimed is:

1. A precipitating agent for water purification processes employing flocculation techniques that consists essentially of a powder with a fineness of 10–20% by weight greater than 60 μm. and 0–2% by weight greater than 90 μm. of a burnt mixture of minerals of the groups: calcium silicates; calcium ferrites; calcium aluminates; calcium aluminum silicates; calcium aluminum ferrites; calcium oxide; calcium iron silicates; calcium magnesium aluminate ferrites; aluminum silicates; iron silicates; quartz; magnesium silicates and iron aluminum oxide, which minerals, after being subjected to a burning process; present mutually different solubility products, the mixture having a mole ratio between basic and acid oxides of 1.0–5.0 and the following analysis data on ignited samples:

| | Percent |
|---|---|
| $SiO_2$ | 15–40 |
| $Al_2O_3$ | 5–15 |
| $Fe_2O_3$ | 3–12 |
| $CaO$ | 15–70 |
| $MgO$ | 0.1–20 |

2. A method of preparing a precipitating agent according to claim 1, characterized by the steps of mixing the starting material in such proportions and burning the mixture at such a temperature that sufficient mineral formation is obtained, and so that the burnt mixture contains minerals of different solubility products and has a mole ratio between basic and acid oxides of 1.0 and 5.0 and the following analysis data on an ignited sample:

| | Percent |
|---|---|
| $SiO_2$ | 15–40 |
| $Al_2O_3$ | 5–15 |
| $Fe_2O_3$ | 3–12 |
| $CaO$ | 15–70 |
| $MgO$ | 0.1–20 | and grinding to the stated degree of fineness.

References Cited

UNITED STATES PATENTS

| | | | |
|---|---|---|---|
| 1,672,584 | 6/1928 | Travers | 210—52 X |
| 2,532,548 | 12/1950 | Heide | 210—45 X |

RICHARD D. LOVERING, Primary Examiner

U.S. Cl. X.R.

210—42, 52; 252—175, 317